Patented Oct. 31, 1944

2,361,508

UNITED STATES PATENT OFFICE 2,361,508

PROMOTED ISOMERIZATION REACTIONS

Eldon E. Stahly and Kenneth C. Laughlin, Baton Rouge, La., assignors to Standard Oil Development Company, a corporation of Delaware No Drawing. Application December 28, 1940, Serial No. 372,184

11 Claims. (Cl. 260—683.5)

The invention relates to the isomerization of paraffinic hydrocarbons by means of a novel catalyst composition. In particular it is desired to convert straight chain or normal paraffins into branched chain or isoparaffins.

The isomerization of normal paraffins of higher molecular weight than propane into their corresponding isomers or branched chain homologues is already well known. For effecting such desired reactions, it is customary to employ metal halides such as, for example, the chlorides, bromides and the like, in conjunction with hydrogen halides such as hydrogen chloride and hydrogen bromide. The metal halides employed are usually derived from the metals aluminum, zinc, iron, zirconium, tin, beryllium, columbium, tantalum and boron. These compounds vary in their effectiveness, depending upon the particular paraffins to be isomerized and upon the reaction conditions to be employed. However, in many instances their catalytic activity varies greatly from the more conventionally used aluminum chloride. In fact, zinc chloride although promoting or effectuating the desired reaction is one of the least desirable metal halides employed in the reaction.

The present invention is concerned with increasing the isomerization activity of aluminum halides such as aluminum chloride and/or aluminum bromide. By the addition of certain inorganic halides to these aluminum halides, it is possible to effectuate an overall increase in the yields of isomeric paraffins when treating the normal or straight-chain paraffins with this promoted catalyst. It is desirable to increase the reaction rate of an isomerization reaction while, at the same time avoiding, as far as possible, increasing to any extent the rate of cracking over what is normally obtained under mild reaction conditions. There are several ways of increasing the rate of reaction in an isomerization process, but in every case heretofore known grave difficulties arise. For example, a higher concentration of catalyst can be employed to increase the reaction rate, but this is not the solution to the problem, because of the fact that all other conditions remaining constant after the catalyst concentration reaches a certain point no further concentration in the catalyst increases the yields or speeds up the rate at which these yields are produced. Furthermore, the use of large quantities of aluminum chloride in an isomerization reactor makes the handling of the mass difficult. It is difficult also to stir the same, or in any other manner agitate the solid catalyst mass in contact with the normal paraffins to be isomerized. Furthermore, by reason of increasing the amount of catalyst present in the reaction zone, the initial cost of operation goes up and the chances of impurities contaminating the catalyst and causing any particularly large quantity of catalyst to become inactive necessarily results in a considerable loss because of the fact that the entire catalyst mass must be discarded. Furthermore, the adequate disposal of the spent catalyst in large amounts is not easy.

Another method which might be suggested for increasing the amount of isomers formed in such an isomerization process would be by the introduction of larger quantities of promoter, such as, for example, hydrogen chloride. However, here again as in the case of increasing the amount of catalyst present after a certain point is reached, no further increase is attainable. Furthermore, if exceedingly large amounts of hydrogen chloride are introduced, it necessitates the building of expensive high-pressure equipment to withstand the usual high pressures built up by reason of such large quantities of hydrogen halide being present in the reaction system. By using larger quantities of hydrogen halide expensive equipment is necessary in order to effectively remove the promoter from the final product and return it to the reaction zone. It is also known that higher temperatures will increase the rate of reaction. But this is also known to increase the rate of cracking as well, and the higher the temperature the more difficult it becomes to accurately control the reaction.

In order to overcome some of these difficulties and still attain an increased rate of conversion, as well as a higher conversion, the present invention contemplates the addition to an isomerization reaction of a secondary promoter such as an inorganic halide usually a polyvalent metal halide or some such similar compound. The reaction, when employing this novel catalyst-promoter combination, is carried out in substantially the same manner as prior art isomerization reactions involving aluminum chloride alone when employed with hydrogen chloride or its chemical derivatives such as ethyl chloride, and the like, under reaction conditions of time, temperature, pressure and the like heretofore employed. By controlling the amount of the promoter added to the aluminum halide employed, the extent of the reaction and the intensity of reaction may be more accurately controlled. It is also possible to adjust the catalyst composition and secondary promoter to conform to a desired feed stock, so that the ultimate final product may be more or less made to order by controlling this catalyst composition and secondary catalyst promoter. By operating according to the principles of the present invention, it is possible to employ mixed paraffinic feeds wherein higher paraffins are present in substantial amounts; for example, straight-run naphthas may be employed as feed stocks, and reaction conditions which might otherwise only be employed with respect to the isomerization of normal butane or normal pentane may be employed in isomerizing such naphthas. This is possible by reason of the fact that the rate of cracking to which the higher paraffins are more readily susceptible has not been increased to any appreciable extent yet the rate of isomerization has been markedly increased.

By reason of the fact that the catalyst activity may be varied depending upon the amount of secondary promoter added thereto, it is possible to conduct a multi-stage process wherein the first stage is carried out with a catalyst and under reaction conditions designed to effect from about 0 up to 30% of the theoretically possible conversion, whereas the second reactor, for example, may contain a slightly more reactive catalyst or inorganic halide promoter besides hydrogen halide, so that the conversion is raised from 30% up to no higher than 50%, and where in a third stage it may be so arranged as to employ a still more reactive catalyst composition, either using the same metal halide, secondary promoter as in the preceding stages, or a different one which has been found to promote greater activity of the aluminum halides in which the conversion may be increased under the proper reaction conditions from about 50% to say 70–75% conversion. Such a process affords an unusually accurate control of the entire process of speeding up and reaching the maximum practical conversion of normal paraffins to isoparaffins while, at the same time, suppressing the formation of cracked products.

The invention may be described as pertaining to the development of various catalyst compositions of varying degrees of reactivity and which contain more than one component. Thus, for example, aluminum halides such as aluminum chloride or aluminum bromide, may represent one component of the catalyst composition. As is well known, these Friedel-Crafts catalysts are quite highly reactive in the isomerization of normal paraffins to isoparaffins. In order to increase and modify to some extent the activity of these aluminum halides, it is desirable to mix in varying proportions one or more of either the same or corresponding halides of other metals, said metals, for example, being selected from the group of polyvalent metals titanium, silicon, tin, vanadium, columbium, tantalum, antimony, bismuth, uranium, tellurium and nickel. The various metal halides of this group of metals all to a greater or lesser extent modify the original acticity of the aluminum halide which serves as a major component of the catalyst composition. By so modifying the catalyst composition to compensate for the inherent reactive tendencies of any particular feed stock, it is possible for the ordinary plant operator to exercise a lower degree of care to accomplish the desired final result than heretofore has been found possible. Various halides may be employed. As exemplary of the specific halides the following are designated:

(1) $TiBr_4$, $TiBr_2$, $TiCl_4$, $TiCl_2$, $TiCl_3$
(2) $SiBr_3$, $SiBr_4$, $SiCl_3$, $SiCl_4$, $SiBrCl_3$, $SiBr_2Cl_2$, $SiBr_3Cl$
(3) $SnCl_4$, $SnBr_4$, $SnCl_2$, $SnBr_2$
(4) $VCl_2$, $VCl_3$, $VCl_4$, $VBr_3$
(5) $CbBr_3$, $CbCl_3$, $CbBr_5$, $CbCl_5$
(6) $TaBr_5$, $TaCl_5$
(7) $SbCl_5$, $SbCl_3$, $SbBr_3$
(8) $BiBr_3$, $BiCl_2$, $BiCl_3$
(9) $UCl_3$, $UCl_4$, $UCl_5$, $UBr_3$, $UBr_4$
(10) $TeBr_2$, $TeBr_4$, $TeCl_2$, $TeCl_4$
(11) $NiBr_2$, $NiCl_2$

Not all of these compounds exhibit a marked promotional activity in and of themselves as compared to aluminum chloride or aluminum bromide. However, in connection with the aluminum halides, there is a definite advantage to be derived. In general, and although there are exceptions, for example in the case of the tellurium, nickel and vanadium halides, those halides the metal of which is attached to the halide at the higher valency of the particular metal are the more desirable for use in conjunction with the corresponding aluminum halides.

The polyvalent metal halide promoters may be employed in varying amounts and, depending upon whether or not the catalyst composition is a di-, tri- or tetra-component catalyst composition, the percentages of the various metal halides will vary considerably. However, in general these halides are employed in amounts between about ½% and 10% by weight of the total hydrocarbon present in the reaction zone at any one time. Preferably the quantity is between about 1% and about 5%. In some instances, particularly where there is a plurality of metal halides employed other than the aluminum halides, it may be desirable to have the catalyst composition contain a greater percentage of the total metal halides than the 10% herein indicated. However, in general the desired degree of activity of the catalyst mass may be controlled within the limits intended by the use of these quantities of metal halide promoters. There may be instances when it is desired to greatly increase the promotional effect of aluminum halides, in which case the use of promoters of relatively low activity would be omitted and promoters of the highest degree of activity would be substituted therefor. Such a promoter would be, for example, antimony pentachloride. Since the amount of polyvalent metal halide promoters admixed with the aluminum halides is controlled within relatively narrower ranges, it is highly desirable to insure that the quantity of metal halide promoters is not materially decreased nor increased. It is therefore desirable that care be taken to avoid the use of reaction vessels whose contact surfaces contain metals readily forming these promoters in the presence of hydrogen chloride and aluminum chloride or in the presence of aluminum chloride and water. If stainless steel autoclaves containing nickel, vanadium and the like are employed, it is desirable to line the vessel with some inert material such as, for example, glass or a non-reactive metal alloy in order to prevent any possible increase in the amount of polyvalent metal halides in the reaction zone. The multi-component catalysts may be employed not only as such but they may likewise be employed in conjunction with absorbent or granular masses or other inert carrying materials such as, for example, fuller's earth, the silica and alumina gels, activated carbon, kieselguhr, Super Filtrol, and various other types of inert catalyst carrier compositions.

The amount of the catalyst employed with reference to the amount of paraffinic hydrocarbon contacted therewith may range from about 2% to about 150% by weight, preferably between about 15% and about 100% by weight depending on the particular paraffin used and, as stated, particularly in cases where the lower concentrations of catalyst are employed, carriers may be used to advantage. The catalyst may be employed not only as a stationary or bed type of contact but it may be prepared as a finely divided, powdered or pelletted composition which can be packed into a tower and have the hydrocarbon or paraffin percolated therethrough; or in more modern types of operation the catalyst may be powdered and introduced in sufficient quantities to form a slurry for activating the reaction and be removed from the reacted mixture by means of a suitable cyclone separator, Cuno liquid phase filter or some other mechanical means.

Those metals heretofore mentioned and which are known to readily form halides by simply contacting the free metal with a suitable hydrogen halide which also serves as a promoter in the reaction may be employed as such in the catalyst composition so that the mixed catalyst composition may be formed in situ. When these free metals are admixed in the desired proportions with metallic aluminum in powdered form, for example, or as flakes, grindings and the like, the entire catalyst composition is prepared in situ and exhibits a surprising reactivity in connection with the desired process.

The hydrogen halide employed as an activator for the reaction may be either hydrogen chloride, hydrogen bromide or hydrogen fluoride. However, preferably the activator contains the same halide as the aluminum halide employed and the metal halide promoter employed. The hydrogen halide activator may likewise be a mixture of two or more of the hydrogen halides just as the polyvalent metal halide promoters and the aluminum halides may represent mixtures of halides. In general, the total hydrogen halide content of the reaction zone ranges between about 2% and about 25% based on the amount of hydrocarbon present in the reactor at any one time. It is preferable to employ between about 10% and about 25% by weight of the hydrogen halide activator since this amount represents the quantity of hydrogen halide which may be dissolved in the hydrocarbon medium in the reactor under the general reaction conditions hereinafter set forth. In general, the hydrogen halide is introduced into the reactor under superatmospheric pressure. Sufficient superatmospheric pressure is preferably employed to maintain liquid phase operation. This may range from about 15 to about 250 lbs./sq. in. gauge or even higher. Vapor phase reactions, however, are contemplated although from the commercial standpoint they do not appear to be quite as economical as the liquid phase reactions. The temperature under which the reaction is maintained may vary considerably as, for example, between about 35° F. and about 400° F., preferably between about 60° F. and about 175° F. Likewise, the time of contact may vary considerably depending upon the temperature and the other reaction conditions such as, for example, between about ¼ and about 10 hours, preferably between about 1–3 hours. In general, the reaction is carried out with an intensive agitation or contacting of the catalyst with the hydrocarbon feed stock since it has been found that the yields are materially influenced depending upon the degree of contact of the catalyst with the feed under the reaction conditions.

The above-described reaction conditions are necessarily correlated with respect to one another and with respect to any particular feed stock employed so that a minimum amount of time elapsing between the time of introduction of the normal paraffins into the reaction and the withdrawal of the reacted mixture therefrom is maintained. In general, the use of high temperatures for the reaction mixture permits the use of a materially reduced reaction time. On the other hand, low temperatures require that the feed stock remain in the reactor for longer periods. Not only are the reaction conditions correlated with respect to the feed but, as heretofore mentioned, the multi-component catalyst composition is likewise varied with respect to any particular feed stock.

As heretofore mentioned, the feed may comprise normal butane, normal pentane, normal hexane, normal heptane and the like. It is likewise within the scope of the invention to employ straight run naphthas or cracked naphthas from which the major portions of aromatic and olefinic constituents have been previously removed. Mixtures of one or more of the heretofore mentioned normally paraffinic compounds, field butanes and similar paraffinic mixtures predominating in normal paraffins are suitable feed stocks for the reaction.

The following example is presented to indicate in a general way the nature of the reaction obtainable by employing the present process. This example is not intended to limit the scope of the invention but is simply presented to illustrate in a more specific nature the character thereof.

EXAMPLE 1

An autoclave equipped with a mechanical stirring means was maintained at a temperature between about 73° F. and about 80° F. and 150 grams each of normal pentane and aluminum chloride were placed therein. Various experiments were carried out in which the quantity of hydrogen chloride, the temperature, the amount of polyvalent metal halide promoters, and time of contact were varied. The following table presents in detail the experimental data obtained in connection with the isomerization of normal pentane to isopentane.

Table I

| Run No. | [1] Per cent HCl | Temp. °F. | Time, hours | Promoter | Per cent promoter | Per cent n-pentane reacted | Product Per cent $C_4-$ | Product Per cent iso-$C_5$ | Product Per cent $C_6+$ |
|---|---|---|---|---|---|---|---|---|---|
| 1 | 5.6 | 76 | 5 | $NiCl_2$ | 1.0 | 96 | 16 | 66 | 14 |
| 2 | 5.6 | 76 | 5 | None | | 79 | 2 | 75 | 2 |
| 3 | 20.7 | 75 | 2 | $NiCl_2$ | 1.0 | 86 | 6 | 75 | 5 |
| 4 | 21.3 | 73 | 2 | None | | 75 | 5 | 66 | 4 |
| 5 | 6.0 | 73 | 3 | $NiCl_2$ | 1.0 | 43 | 0 | 43 | 0 |
| 6 | 6.3 | 74 | 3 | None | | 37 | 0 | 37 | 0 |
| 7 | 6.0 | 73 | 3 | $VCl_2$ | 2.0 | 88 | 19 | 54 | 15 |

[1] All percentages are by weight based on the total paraffins present in the autoclave at any one time.

EXAMPLE 2

Normal butane was introduced into an autoclave and maintained under a temperature of 212° F. The catalyst employed was aluminum chloride in an amount of about 15% by weight of the normal butane. This catalyst was promoted with vanadium chloride ($VCl_2$) in an amount of 1.5% by weight of the feed. After a period of 12 hours of agitation in the liquid phase, the reacted mixture had isolated therefrom isobutane in an amount of about 39.8% by weight. It was found that about 41.4% by weight of the normal butane had reacted and that the product contained 0.8% of $C_3$ and lighter hydrocarbons and about 0.8% of $C_5$ and heavier paraffins. The isobutane was formed with a selectivity of about 96%. In a comparative run made under the same conditions with catalyst from the same source but without the addition of vanadium chloride as a promoter it was found that 18.8% by weight of the normal butane had reacted and 18.4% by weight of isobutane was produced.

Under substantially identical reaction conditions and using the same catalyst and reactant as outlined in Example 2 but where in addition hydrogen chloride was employed with the normal butane, the yield of isobutane increased to about 54.5% by weight of the reacted $C_4$ product, and it was found that about 57.7% by weight of the normal butane fed to the reactor had undergone reaction. This indicated a selectivity of about 95%, only 0.9% by weight of $C_3$ and lighter paraffins were formed and only about 2.3% by weight of $C_5$ and heavier paraffins were formed. In a comparative run made under the same conditions with catalyst from the same source and with hydrogen chloride as a promoter but without the addition of vanadium chloride a yield of about 21.7% by weight of isobutane was obtained at a conversion of about 24.7% of the normal butane feed.

Throughout the specification and claims the terms "metal halide," "polyvalent metal halide," etc., have been employed to include the halides of the elements silicon and tellurium. It is realized that ordinarily these elements are not considered to belong to the group "metals" although they do exhibit some of the physical and chemical properties of metals. For the purpose of clearly defining and disclosing the present invention, it is intended that these two elements be considered as belonging to the "metal" group.

Having thus fully described and illustrated the character of the invention, what is claimed as new and useful and desired to be secured by Letters Patent is:

1. A process which comprises reacting at least one paraffin containing at least four carbon atoms per molecule under isomerization reaction conditions in contact with a major portion of an aluminum halide promoted with a minor portion of at least one halide of a polyvalent element taken from the group consisting of titanium, silicon, tin, vanadium, columbium, tantalum, antimony, bismuth, uranium, tellurium and nickel.

2. A process as in claim 1 wherein the catalyst and promoters contain the same halide and wherein an activator of at least one hydrogen halide is also present.

3. A process which comprises reacting at least one paraffin containing at least four carbon atoms per molecule under isomerization reaction conditions in contact with a major portion of aluminum chloride and with a minor portion of at least one chloride of a polyvalent element taken from the group consisting of titanium, silicon, tin, vanadium, columbium, tantalum, antimony, bismuth, uranium, tellurium and nickel.

4. A process which comprises isomerizing at least one straight chain paraffin containing at least four carbon atoms per molecule at a temperature between about 40° F. and about 400° F. in contact with a major portion of an aluminum halide, and promoted with a minor portion of a polyvalent element halide taken from the group consisting of chlorides and bromides of titanium, silicon, tin, vanadium, columbium, tantalum, antimony, bismuth, uranium, tellurium and nickel and activated with at least one hydrogen halide under superatmospheric pressure at least sufficient to maintain liquid phase operation, with agitation, while correlating the feed stock, temperature, catalyst-promoter composition, time of reaction, and pressure so as to effectuate a substantial conversion in the liquid phase of straight chain paraffins into branched chain paraffins.

5. A process as in claim 4 wherein the promoters employed contain the same halogen as the aluminum halide employed.

6. A process as in claim 4 wherein the aluminum halide is employed in an amount between about 10% and about 150%, the polyvalent element halide in an amount between about ½% and about 10% and the hydrogen halide in an amount between about 2% and about 25%, the amounts of said components being based on the total amount by weight of hydrocarbons present in the reaction zone at any one time.

7. A process which comprises contacting a normal paraffin of at least four carbon atoms per molecule with about 100% of its weight of aluminum chloride, between about 1% and about 5% of its weight of a chloride of an element taken from the group consisting of titanium, silicon, tin, vanadium, columbium, tantalum, antimony, bismuth, uranium, tellurium and nickel, and between about 15% and about 25% of its weight of hydrogen chloride, at a temperature between about 60° F. and about 175° F. under superatmospheric pressure to maintain liquid phase operation, agitating the reaction mixture under said reaction conditions for between about ½ hour and about 10 hours, and recovering branched chain paraffins from the reacted mixture.

8. A process which comprises contacting normal pentane with about 100% of its weight of aluminum chloride, about 1% of its weight of nickel chloride, and between about 5% and about 23% of its weight of hydrogen chloride, with agitation, for about 2 hours and recovering isopentane from the reacted mixture.

9. A process which comprises isomerizing normal pentane at a temperature of about 76° F. in the presence of about 100% of its weight of aluminum chloride, about 1% of its weight of nickel chloride and about 5.6% of its weight of hydrogen chloride, while agitating the reaction mixture under these conditions for about 5 hours and recovering isopentane from the reacted mixture.

10. A process which comprises isomerizing normal pentane at a temperature of about 73° F. in contact with about 100% of its weight of aluminum chloride, about 1% of its weight of nickel chloride and about 6% of its weight of hydrogen chloride, with agitation under the reaction conditions for about 3 hours, and recovering isopentane from the reaction mixture.

11. A process which comprises isomerizing normal pentane at a temperature of about 73° F. in contact with about 100% of its weight of aluminum chloride and about 2% of its weight of vanadium dichloride and about 6% of its weight of hydrogen chloride for about 3 hours, with agitation under the reaction conditions, and recovering isopentane therefrom.

ELDON E. STAHLY.
KENNETH C. LAUGHLIN.